May 5, 1959 N. MILLER 2,884,657
SHRIMP PROCESSING MACHINE
Filed July 27, 1956 4 Sheets-Sheet 3
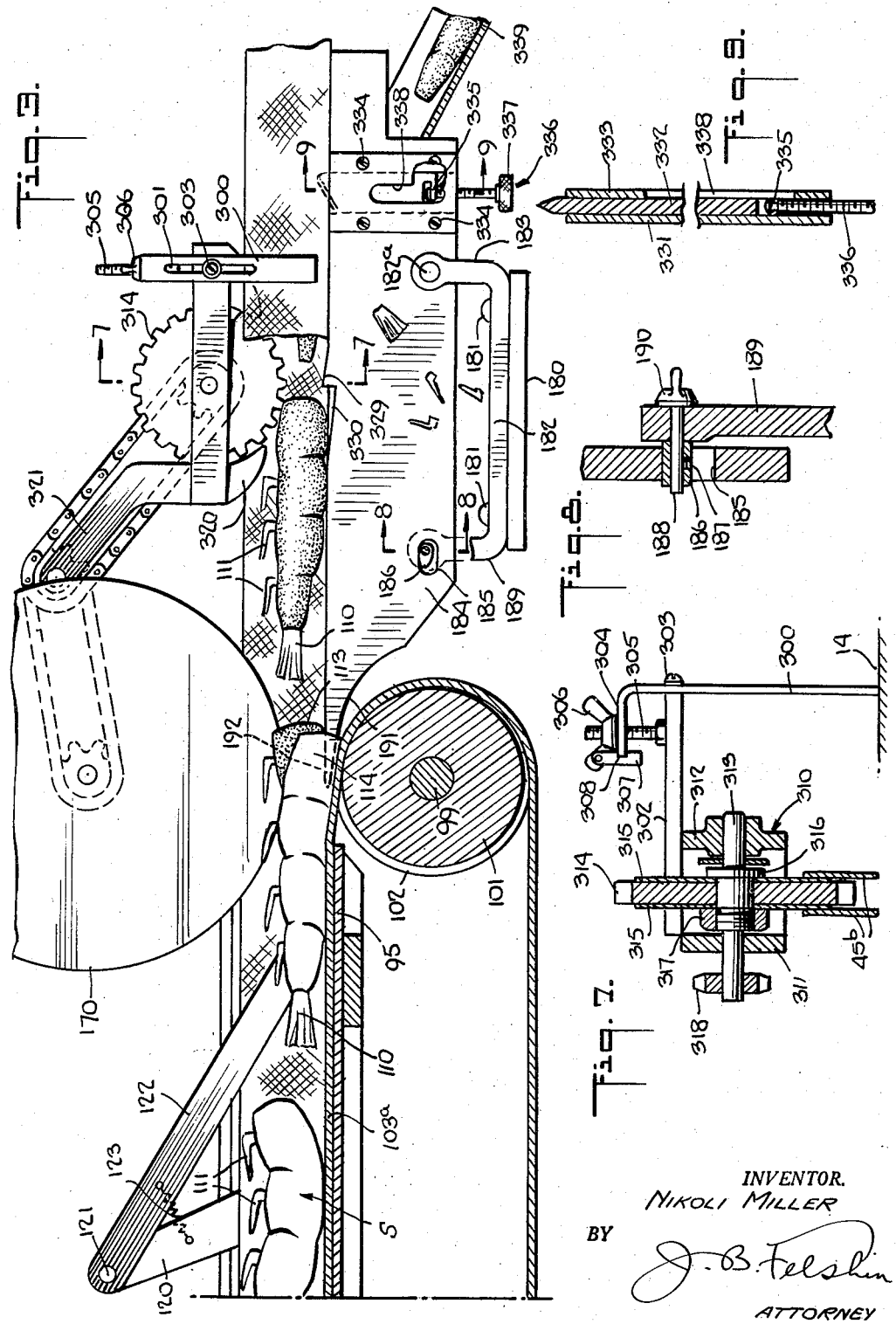
INVENTOR.
NIKOLI MILLER
BY J. B. Felshin
ATTORNEY May 5, 1959  N. MILLER  2,884,657
SHRIMP PROCESSING MACHINE
Filed July 27, 1956  4 Sheets-Sheet 4

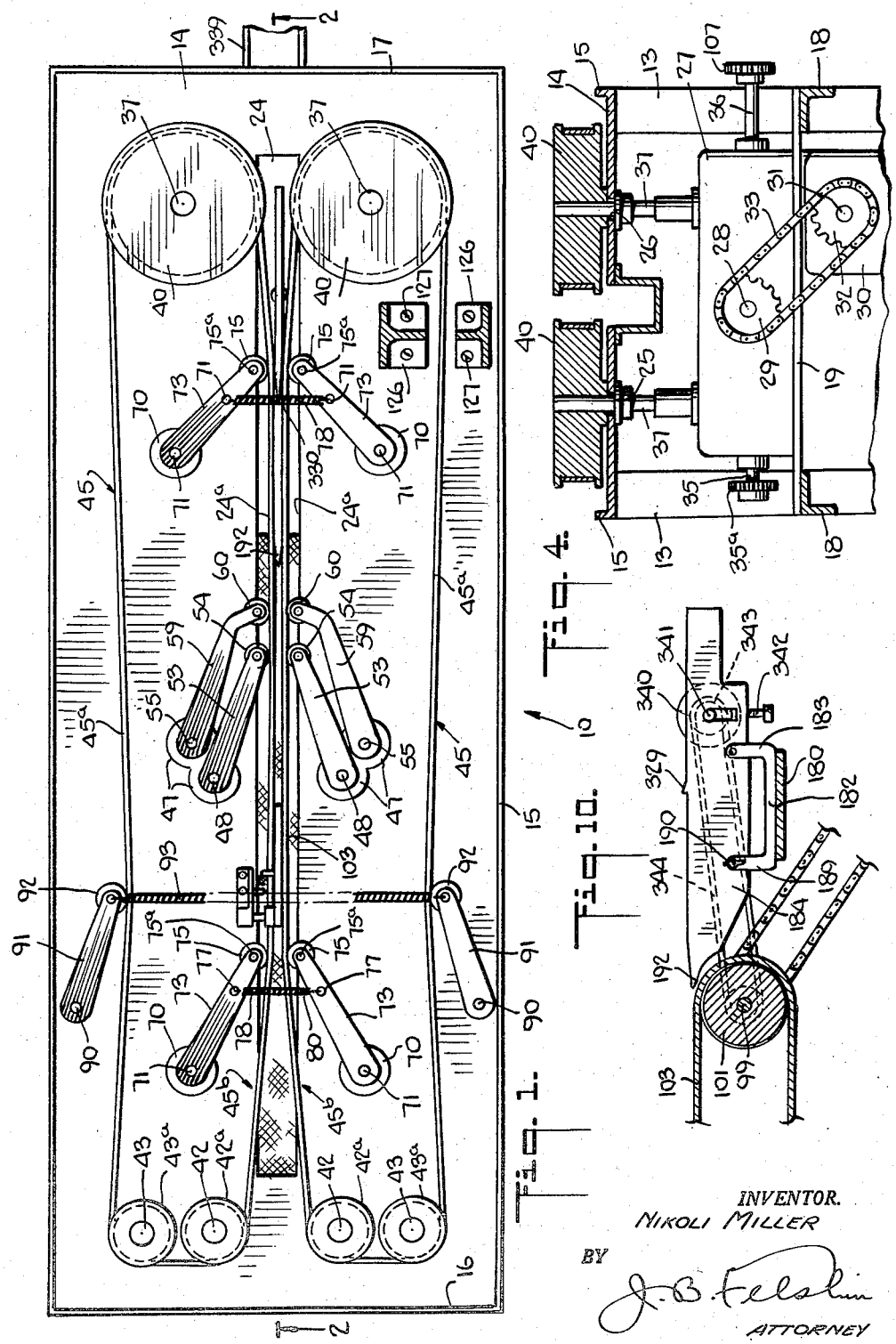

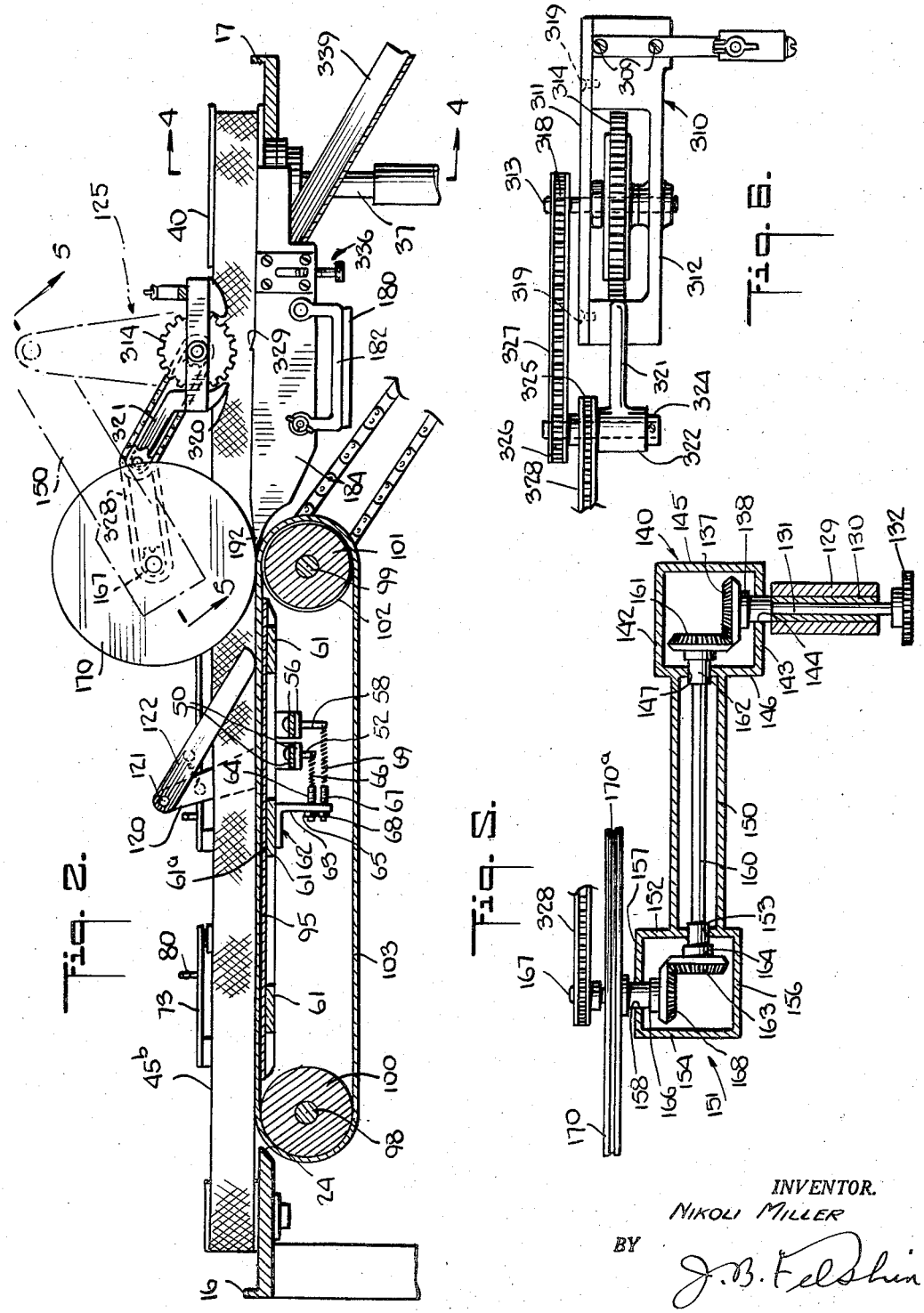

INVENTOR.
NIKOLI MILLER
BY
J. B. Felshin
ATTORNEY

United States Patent Office 2,884,657
Patented May 5, 1959

2,884,657
SHRIMP PROCESSING MACHINE
Nikoli Miller, St. Simons Island, Ga.
Application July 27, 1956, Serial No. 600,551
10 Claims. (Cl. 17—2)

My invention is directed to shrimp processing machines and is directed particularly to a machine for automatically peeling, deveining, removing legs and tails from shrimps and, when required splitting shrimps in preparation for butterfly style cooking.

In my co-pending application entitled "Shrimp Peeling, Veining and Meat Separating Machine" Serial No. 346,449 filed April 2, 1953, now Patent No. 2,760,225, issued August 28, 1956, there is disclosed a machine for automatically peeling, deveining and defeathering (removing legs from) shrimp. My present invention has for its principal object the improvement of the machine described in the above-mentioned prior application.

Another object of my invention is to provide adjustable mechanism for automatically deveining and removing the shell from shrimps, said mechanism comprising a piercing and spreading tool means for moving decapitated shrimp against the piercing and spreading tool, and mechanism for adjusting the piercing and spreading tool relative to the shrimp moving means in order to reset the tool to compensate for wear, or to accommodate various sizes of shrimp to be processed.

Still another object of my invention is to provide a machine of the character described comprising a pair of symmetrically arranged belts mounted on top of a horizontal table, said belts being driven by wheels turning about vertical axes with said belts having adjacent inner runs adapted to grip a shrimp therebetween to move it forwardly, highly improved means being provided to remove the legs and tails from the peeled shrimp as it passes through the machine.

Still another object of this invention is to provide, in a machine of the character described, a vertically rotating gear wheel over the shrimp moving means for removing the legs from the shrimp after they are peeled, said leg removing gear wheel being adjustable with respect to the shrimp passing through the machine for effectively removing legs from shrimp of various sizes.

Still a further object of my invention is to provide a machine of the above nature having means for longitudinally splitting the peeled, deveined and de-legged shrimp as they move through the machine in preparation for cooking butterfly shrimp dishes.

Yet a further object of this invention is to provide in a machine of the character described highly improved means for removing the tail of the deveined and peeled shrimp.

Still a further object of this invention is to provide a strong, rugged and durable machine of the character described which shall be relatively inexpensive to manufacture, smooth and positive in operation and yet practical and efficient to a high degree in use.

Other objects of this invention will in part be obvious and in part hereinafter pointed out.

The invention accordingly consists in the features of construction, combination of elements and arrangement of parts which will be exemplified in the construction hereinafter described and of which the scope of the invention will be indicated in the following claims.

In the drawings forming a part of the specification, and accompanying the same,

Fig. 1 is a top plan view of the machine, with parts broken away, embodying the invention;

Fig. 2 is a cross-sectional view taken along the line 2—2 of Fig. 1;

Fig. 3 is an enlarged view of a part of the structure shown in Fig. 2;

Fig. 4 is a cross-sectional view taken along the line 4—4 of Fig. 2;

Fig. 5 is a cross-sectional view taken along the line 5—5 of Fig. 2;

Fig. 6 is a top view of the leg removing mechanism portion of the machine illustrated in Figs. 2 and 3;

Fig. 7 is a vertical cross-sectional view taken along the line 7—7 of Fig. 3;

Fig. 8 is a vertical cross-sectional view taken along the line 8—8 of Fig. 3;

Fig. 9 is a vertical cross-sectional view taken along the line 9—9 of Fig. 3;

Fig. 10 is a vertical view of the shrimp deveining, peeling and tail removing mechanism showing a modified form of the shrimp splitting device;

Figure 11:
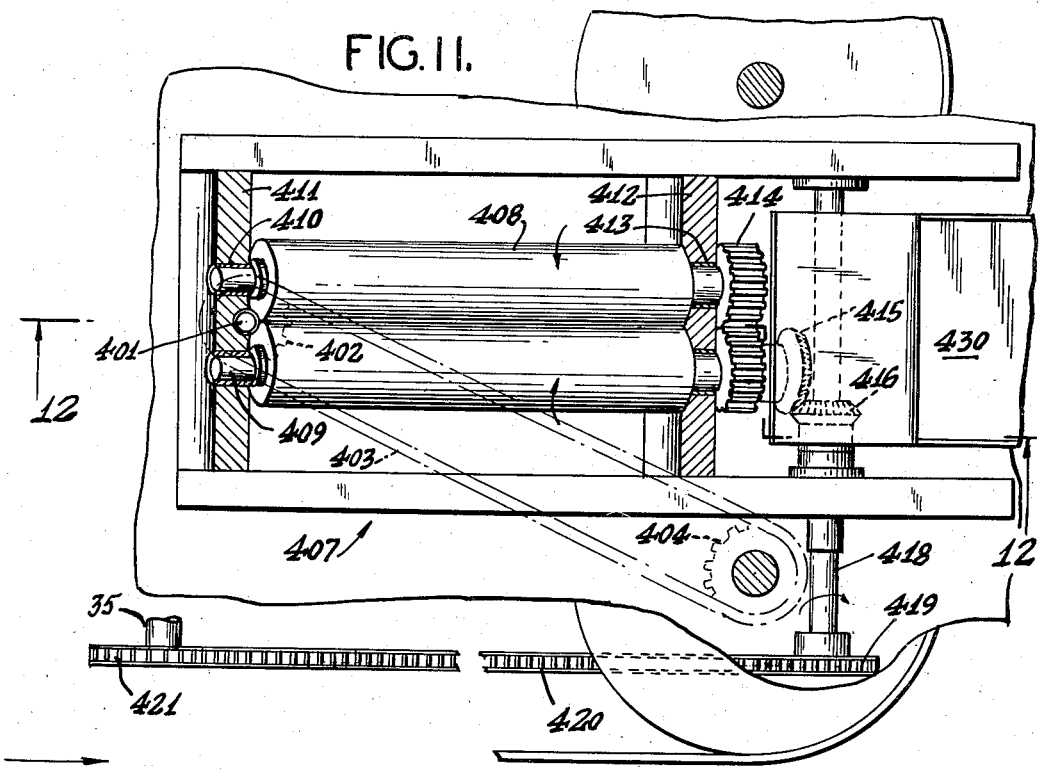
Fig. 11 is a top plan view of a machine embodying the invention illustrating a modified form of removing the tail of the shrimp.

Referring now in detail to the drawings, 10 designates the machine embodying the invention. The same comprises a table or platform 14 supported at each end by a pair of legs 13 (see Fig. 4). The table or platform 14 is provided with upstanding side flanges 15, a rear upstanding flange 16 and a front upstanding flange 17. Said front and rear legs are interconnected by a pair of horizontal angle irons 18 supporting a transverse platform 19 disposed below the table top 14 (see Fig. 4).

The table 14 is formed with a central longitudinal slot 24 terminating short of the end flanges 16 and 17 of the table. Said table is furthermore formed with a pair of through openings 25, 26 symmetrically disposed with respect to the slot 24 and located adjacent the forward end of said slot.

Mounted on the platform 19 is a gear reduction box 27. Mounted on the gear reduction box 27 is an output shaft 28 carrying a sprocket gear 29. The sprocket gear 29 is interconnected by means of a sprocket chain 33 with the sprocket gear 32 on the output shaft 31 of an electric drive motor 30 mounted below the platform 19. Since the drive mechanism mounting means and the table support mechanism is similar to that fully described in the above-mentioned co-pending application, it is not considered necessary to illustrate said structure in greater detail herein.

Mounted within thet gear reduction box 27 are a pair of horizontally aligned shafts 35 and 36, one extending to one side of the box and the other to the other side of the box. Extending upwardly from the gear box 27 are a pair of similar symmetrical vertical output shafts 37. Within the box 27 is a suitable reduction gearing for rotating the shafts. The vertical shafts rotate in opposite directions, the lower shaft, looking at Fig. 1, rotating in a clockwise direction and the upper shaft in a counterclockwise direction. The shaft 35 is rotated in a clockwise direction, looking at Fig. 4 from the right-hand side of the drawing. The shaft 36 rotates in a direction opposite to the direction of rotation of shaft 35. The shaft 37 rotates at the same speed.

The shafts 37 project upwardly through said openings 25, 26 in the table or platform 14. Mounted on the portions of said shaft which project above the table are flanged pulleys or wheels 40. Said pulleys are similar and symmetrically disposed with respect to the slot 24.

Mounted at the rear end of the table 14 at opposite sides of slot 24 and rearwardly thereof are symmetrically arranged pairs of shafts 42, 43 on which are mounted flange pulleys 42a and 43a. The axes of the shafts 42, 43 are all on the same vertical plane. Surrounding each pulley 40 and the pulleys 42a and 43a on the same side of the slot 24, is a belt 45. The belts 45 are symmetrical relative to slot 24. Each belt 45 has an outer longitudinal run 45a and an inner longitudinal run 45b. The inner runs 45b are normally spaced from each other substantially by the width of the slot 24 and would run parallel except that they are pressed toward each other by means to be described hereinafter. The pulleys 42a and 43a are idlers, motion being imparted to the belts 45 by pulleys 40.

Means is provided to press the inner runs 45b of the belts 45 toward each other. To this end, the table is provided on opposite sides of slot 24 with pairs of bushings 47, one pair of bushings being closer together than the other pair. Extending through one pair of bushings are vertical pins 48 projecting below said bushings. Fixed to the lower ends of the pins 48 are arms 50 extending toward each other and overlapping with the one arm spaced above the other (see Fig. 2). The arms 50 are formed with registering slots extending through which is a cotter pin 52. Fixed to the upper ends of the pins 48 are arms 53 inclined toward each other (see Fig. 1). Carried by the inner end of each arm 53 is a roller or follower 54 contacting the inner surface of the inner run 45b of one of the belts. It will be noted that the bushings 47 and the arms 53 are located between the runs 45a and 45b of the belts.

Extending through the other pair of bushings 47 are pins 55, on the lower ends of which are fixed arms 56 provided with registering slots through which extend a cotter pin 58. Fixed to the upper end of the pins 55 and disposed above the table are arms 59 inclined toward each other and carrying at their forward ends rollers 60 likewise contacting the inner runs 45b of the belt 45. The cotter pins 58 extend to a point below the cotter pin 52.

Interconnecting the inner edges 24a of the slot 24 are a plurality of horizontally arranged transverse spacers 61 having top surfaces 61a disposed below the top surface of the table.

Attached to the underside of one of the spacers 61 is a transverse angle iron 62 having a vertical downwardly extending wall or flange 63 formed with an opening through which extends a screw 64 (see Fig. 2). A nut 65 on said screw contacts the back of wall 63. Screw 64 is connected by a coil spring 66 to the pin 52. A second screw 67 extends through an opening in the vertical flange 63 of the angle iron 62 and carries a nut 68 contacting said flange. Screw 67 is connected by spring 69 to the pin 58. Thus pins 52 and 58 are drawn rearwardly tending to rotate the arms 63 toward each other and also the arms 59 toward each other. By turning the nuts 65 and 68 the tension on the spring 66 and 69 may be adjusted for adjusting the pressure of the roller 54 and 60 against the inner run 45b of the belts 45. Preferably the pressures of these rollers should be equal. The rollers 54 and 60 are located substantially at the middle of the inner runs 45b.

Attached to the top of table 14 and on opposite sides of the inner runs 45b of the belts 45 are aligned pairs of bushings 70. Journalled in each bushing is a pin 71 projecting above the bushing. Attached to the upper end of each pin 71 is an arm 73 inclined forwardly and inwardly. Attached to the inner end of each arm 73 and extending downwardly therefrom is a pin 75a formed with a head at its lower end. Mounted on each pin 75a is a roller 75 formed with a flange at its upper end.

The rollers 75 contact the inner runs 45b of the belts. The front and rear pairs of arms 73 carry fixed upstanding pins 77. Each pair of pins 77 are interconnected by a coil tension spring 78 which press the respective roller pairs 75 towards each other.

Means is provided to take up the slack in the belts 45 and to keep them taut. To this end there is fixed to the table top 14 and near the top side flanges 15 pins 90 located between the outer runs 45a of the belts 45 and said flanges 15 and closer to the rear pulleys 43a than to the front pulleys 40. Pivoted to the pins 90 and extending forwardly therefrom are arms 91 carrying rollers 92 contacting the outer runs of the belt. Said arms are drawn to each other by coil tension spring 93 interconnecting said arms.

Supported on the transverse spacer strips 61 is a horizontal flat bar 95 (see Figs. 2 and 3) the top surface of which is flush with the top surface of the table 14. The rear end of the bar 95 is spaced from the rear end of the slot 24. The forward end of the bar 95 is spaced from the forward end of the slot 24 by a greater space. Attached to the underside of the table 14 adjacent the slot 24 are a pair of bearings (not illustrated), supporting a pair of transverse horizontal parallel shafts 98, 99 crossing beneath the slot 24 (see Fig. 2). The rear shaft 98 is located at the rear end of the slot 24. The front shaft 99 is located forwardly of the forward end of the bar 95.

Mounted on shaft 98 is a wheel or pulley 100. Mounted on shaft 99 is a wheel or pulley 101. The pulley 101 is formed with an annular central groove 102. The pulleys 100 and 101 project upwardly into the slot 24. The tops of the pulleys are substantially flush with the top surface of the table 14. Received on said pulleys is a belt 103. Spacer strips 61 are located between the pulleys 100 and 101. The bar 95 is also located between said pulleys. The top run 103a of the belt 100 rests on the bar 95 and is located below the lower edges of the inner runs 45b of the belts 45. The lower edges of said belts 45 are spaced above the table top 14 and substantially at the level of the upper surface of the upper run 103a of the belt 103. The shaft 99 is connected with the sprocket wheel 107 of output shaft 36 of the gear box 27 by means of a chain drive mechanism (not illustrated). The shaft 99 is thus driven by drive motor 30 to move the upper run of the belt 103 forwardly, or in the same direction as the inner runs 45b of the belt 45. It will now be understood that the shrimp S may be fed between the inner runs 45b of the belts 45 from the rear end of the machine. These shrimp, previously decapitated, are moved upon their backs forwardly over the table until they are gripped by the belts 45. It will be noted that the pulleys 42a are spaced apart, and that the portions of the inner runs of the belts passing from said pulleys are inclined inwardly towards each other as shown in Fig. 1 of the drawings to facilitate insertion of the shrimp. The shrimp are decapitated before insertion into the machine. The tails 110 are to the rear and the legs 111 are at the top. The shrimp S rests on run 103a of belt 103. The sand vein 112 in the body 113 of the shrimp is at the bottom. The shell 114 surrounds the body.

It is the purpose of this machine to clean out sand vein 112, to remove the shell 114 from the body 113, to remove the legs 111 and the tail 110, and, when desired, to longitudinally split the cleaned shrimp. All the operator has to do is to insert the shrimp one after the other between the inner runs of the belt, and as the shrimp is moved forwardly, the deveining operation, as well as the removal of the shell, the legs and the tail and splitting of the shrimp is carried out automatically by means hereinbelow described.

Means is provided to hold the shrimps down against the top run 103a of the belt 103. To this end, there is fixed to the table top 14 and at one side of one of the inner runs 45b, an upwardly and rearwardly inclined arm or bracket 120 carrying a horizontal pin 121 at its upper end. Pivoted to the pin 121 and inclined downwardly and forwardly thereof is an arm 122 received between the inner runs 45b of the belts 45. Arm 122 is interconnected to arm 120 by coil tension spring 123 (see Figs. 2 and 3). The lower end of the arm 122 contacts the top of the shrimp as the shrimp passes lengthwise through the machine and presses it down against the upper run 103a of the belt 103. It will be noted that the arm 122 is located rearwardly of the front belt drive wheel 101.

Means is provided to press the shrimp down against the portion of the upper run of the belt which begins to contact the front wheel 101. To this end there is fixed to the table top 14, just rearwardly of one of the pulleys 40, an upstanding bearing member 125. The bearing member 125 comprises a pair of legs 126 (partially shown in cross-section in Fig. 1) straddling the outer run 45a of the belt 45 located at the side of the machine corresponding to the side where the shaft 35 is located. Each leg 126 is attached to the table top by screws 127. The legs 126 carry a horizontal transverse sleeve 129 (see Fig. 5), in which is located a bushing 130. Passing through the bushing 130 is a shaft 131 carrying at one end a sprocket wheel 132. The sprocket wheel 132 is connected by sprocket chain (not illustrated), to a sprocket wheel 35a on shaft 35. Thus shaft 131 is rotated by motor power drive from the motor 30.

Fixed to the opposite end of shaft 131 is a bevel gear 137. On shaft 131 is bushing 138 in which said shaft is journalled. Mounted on bushing 138 is gear box 140. Gear box 140 has top and bottom walls and outer wall 142 and an inner wall 143 formed with an opening 144 in which the bushing 138 is mounted. Said box also has one end wall 145 and an opposite wall 146 formed with opening 147. Fixed to wall 146 is a sleeve 150. Fixed to the opposite end of the sleeve 150 is another box 151. The box 151 has a wall 152 formed with an opening 153 aligned with the opening 147. Box 151 has a wall 154 opposite wall 152. Said box also has an inner wall 156 and an outer wall 157. Wall 157 is formed with an opening 158. Extending through the sleeve 150 is a shaft 160. Fixed to one end of the shaft is a bevel gear 161 meshing with the bevel gear 137 and located within the box 140. On said shaft 160 is a bushing 162 mounted within the opening 147. Fixed to the opposite end of the shaft 160 is bevel gear 163 located within the box 151. On said shaft 160 is bushing 164 mounted within the opening 153. Within opening 158 is mounted a bushing 166. Journalled within bushing 166 is a shaft 167. Fixed to one end of the shaft is a bevel gear 168 located within box 151 and meshing with bevel gear 163. Mounted on one end of shaft 167 is a disc 170 the lower portion of which is received between the inner runs 45a of the belt 45. The axis of shaft 167 is located substantially directly above the axis of shaft 99.

It will now be noted that when the motor operates, disc 170 will rotate in a clockwise direction, looking at Figs. 2 and 3 of the drawings. Said disc 170 may be formed with a central peripheral groove 170a. As the disc 170 rotates, it will press the shrimp down against the top of the belt as the belt begins to contact the wheel 101.

Adjustable means is provided to devein the shrimp and at the same time to separate the shell 114 from the body of the shrimp. To this end there is provided a transverse support bar 180 (see Fig. 3) beneath the table 14 and fixed with respect thereto. Secured to said support bar as by screws 181 and at a position between the wheel 101 and the pulleys 140 and below the slot 24 is an upstanding U-shaped holder 182. Pivoted as by pivot pin 182a to the forward arm 183 of the holder 182 is the forward end of a flat piercing or deveining tool 184 disposed in a vertical plane. Said veining tool has near its rearward end a horizontally extending elongated opening 185. Disposed within the opening 185 is a cam member 186 fixed, as by said screw 187, to one end of a shaft 188 extending through an opening in the rearward arm 189 of the holder 182. The other end of said shaft is threaded and has disposed thereon a wing nut 190. It will thus be apparent that the rearward end of the veining tool 184 can be adjusted upwardly or downwardly for best position for the size of the shrimp being processed, and to compensate for wear by resetting the cam member 186 and tightening it in place by means of the wing nut 190.

The tool 184 has a rear curved-under edge 191 substantially contacting the curved surface of the portion of belt 103 which contacts the upper portion of wheel 101. Said tool has a rearwardly extending point 192 located substantially directly above the axis of shaft 99, said point constituting the rear end of the curved-under edge 191. Said tool 184 has its top edge normally located slightly above the upper surface of the upper run 103a of the belt 103, said upper edge extending forwardly of the point 192. The curved edge 191 may be substantially 90° in extent.

As the shrimp is moved forwardly between the inner runs 45b of the belts 45, and is pressed down first by arm 122 and then by rotating disc 170, the forward end 192 of the tool 184 will enter the vein 112 of the shrimp and said tool will also engage the inside of the bottom portion of the shell 114. The body of the shrimp will contact the top edge of the tool and be moved forwardly, but the shell, being weak at the top, will break at that place and be drawn downwardly between the curved edge 191 and the belt 103. Thus the shell 114 will be separated from the body of the shrimp, and at the same time the said vein of the shrimp will be cleaned out and removed.

It will be noted that the curved edge 191 is aligned with the annular groove 102 in the wheel 101 so that the belt may be pushed into the groove at the place where the shell is wedged or moves between the edge 191 and the belt. The groove 102 therefore permits the belt to be pressed inwardly so as to facilitate passage of the shell. A chute can be provided for guiding the shrimp shells into a container for disposal as they fall away from the removing mechanism.

It will be noted that the legs 111 remain with the shrimp body as it slides along the top of tool 184 and between the inner run 45b of the belt. Improved means is provided for removing these legs from the body of the shrimp. To this end there is fixed to the table top 14 an upstanding bracket 300 having an elongated vertical slot 301 in its upper end. Horizontally supported with respect to the bracket 300 is a horizontal member 302 into one end of which a screw 303 extends through the slot 301. The upper end of the bracket 300 is bent over at 304 to provide additional support means for the horizontal member 302, said means comprising a threaded stud 305 secured to said horizontal member and extending upwardly through an opening in the vent over portion 304. A wing nut 306 is threaded upon the upper end of stud 305. Thus, upon loosening the screw 303, the horizontal member 302 may be adjusted up and down with respect to the bracket 300 for the purpose hereinafter appearing. The wing nut 306 has pivoted to one wing thereof a lock lever 307 having a notch 308 adapted when in downwardly-hanging position to receive the outer end of bent-over portion 304 to lock the wing nut 306 in place and thereby prevent loosening of the horizontal member 302.

Fixed to the outer end of the horizontal member 302 as by screws 309 is a journal carriage member 310 (see Figs. 6, 7) having spaced side portions 311 and 312 between which a gear wheel shaft 313 carrying a gear wheel 314 preferably of brass or hard rubber is journalled. As can best be seen in Fig. 7, the gear wheel 314 is disposed vertically with its lower end portion extending between the belt runs 45b at a position forward of the wheel 101. The gear wheel 314 is faced by side discs 315 of lesser diameter than said gear, said gear and discs being removably secured against a shoulder portion 316 of the shaft 313 by an opposing nut 317 threaded on said shaft. The shaft 313 extends through side portion 311 of the carriage member 310 and has a sprocket gear 318 fixed upon its outer end. The side portion 311 may consist of a side plate fixed against said carriage member as by machine screws 319.

The rearward end of the carriage member 310 comprises a downwardly curved portion 320 extending partially around the periphery of the gear wheel 314 (see Fig. 3) and an upwardly and rearwardly inclined portion 321 terminating in a transverse bearing sleeve portion 322. Journalled in said sleeve portion is a shaft 323 having fixed thereto at one end a collar 324 and at the other end a pair of sprocket gears 325 and 326. A sprocket chain 327 interconnects the sprocket gears 326 and 318. A sprocket chain 328 interconnects the sprocket gears 167 and 325. Thus the gear wheel 314 is driven counter-clockwisely (see Fig. 3) to abrade off the shrimp legs 111 as the shrimp move through the machine.

Means is provided to remove the tails 110 from the shrimp, said means comprising an upwardly projecting tail-puller portion 329 on the upper edge of the deveining tool 184. Said tail-puller is located directly below the axis of rotation of the leg removing gear wheel 314. The top surface of the tool 184 has a triangular tapered recessed portion 330 extending rearwardly of the tail-puller portion 329. As the shrimp move forwardly through the machine under the gear wheel 314, their legs 111 are abraded off, and the tail ends of the shrimp are pushed downwardly within the recessed portion 330 of the tool 184 so that the tail-puller portion 329 readily will catch and pull off the harder tail of the shrimp as shrimp moves forwardly through the machine. The hereinabove described vertical adjustment mechanism for the gear wheel 314 permits setting the height of said gear wheel for most efficient leg and tail removal for any given average size of shrimp being processed. The gear wheel can also be set so that only the legs and not the tails are removed if desired.

Means is also provided for vertically slitting the cleaned shrimp meat before it leaves the machine, preparing them for cooking butterfly style. To this end one side of the forward end of the tool 184 is recessed to provide a slot 331 within which is disposed a vertically adjustable slitting knife blade 332. A cover plate 333 fits against the side of said tool over said recess and is held thereon as by machine screws 334. The tool 184 preferably is provided with reduced thickness portions providing seats for receiving the cover plate 333 flush with the side surface of said tool. The lower end of the slitting blade 332 has a horizontally extending arm portion 335 within which the end of an adjustment screw 336 extends. Said screw end is of reduced diameter to provide a shoulder against which the lower surface of the arm portion 335 rests, and the end of said screw end is flattened to hold said arm portion captively yet allow mutual rotational motion with respect thereto. The lower end of the adjustment screw 336 is threaded and extends through an internally threaded opening in the tool 184 below the slot 331. The lower end of the adjustment screw 336 is provided with a knurled head 337. The cover plate 333 is provided with a longitudinal slot 338 for observing the adjusted height of the slitting blade 332. The upper end of the knife blade 332 is sharpened and is downwardly inclined from front to back, as can be seen in Fig. 3.

If it is desired to slit the shrimp in the processing operation of the machine the adjustment screw 332 is merely turned so as to raise the knife blade 332 whereupon the previously cleaned shrimp will be slit by the desired amount as determined by the height of the blade as they are carried through the machine just before dropping into the discharge chute 339 at the front end of the machine.

Fig. 10 illustrates a modification of the above described shrimp splitting mechanism wherein a rotating disc knife 340 is used instead of the blade 332. In this modification the disc knife 340 is secured to a shaft 341 journalled in side portions of the tool 184 and vertically adjustable with respect thereto by an adjustment screw 342. One end of the shaft 341 extends beyond the side of the tool 184 and has fixed thereon a sprocket gear 343. A sprocket chain 344 interconnects the sprocket gear 343 with a sprocket gear 345 mounted on shaft 99 for rotating the disc knife 340.

Any suitable water supply system (not illustrated) may be provided for washing the shrimp as they pass through the machine.

It will be noted that in Figs. 1–9 there is illustrated a tail peeling portion 329 located on the blade 184. This tail peeling portion may be replaced by tail peeling mechanism illustrated in Figs. 11 and 12. It will be understood that when the structure of Figs. 11 and 12 is employed, the tail peeler 329 and the notch 330 may be omitted.

Figure 12:
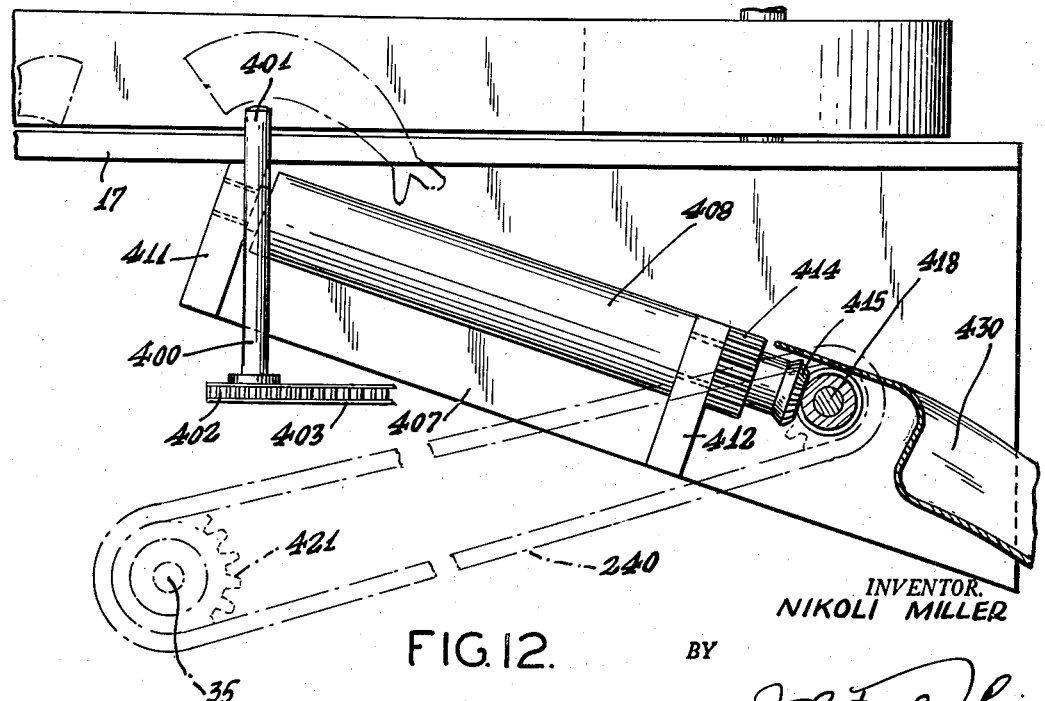
Fig. 12 is a cross-sectional view taken on line 12—12 of Fig. 11.

The tail peeling or removing mechanism of Figs. 11 and 12 comprises a vertical pin 400 having an upper end 401 projecting above the upper surface of the table 17 and supported in any suitable manner. The table 17 is open between the belts 45b beyond the pin 400. The pin 400 carries at its lower end a sprocket wheel 402 connected by sprocket chain 403 to a sprocket wheel 404 fixed to one of the shafts 37 which carry the belt pulleys 40. It will now be understood that as the belts 45 move, the pin 400 will continuously rotate.

Mounted on the machine in any suitable manner and below the table 17 is a bracket 407 which inclines downwardly and forwardly. Supported on the bracket 407 are a pair of rollers 408 carried by shafts 409 passing through suitable bushings 410 in one wall 411 of said bracket 407. The bracket 407 has a lower wall 412 provided with bushings 413 receiving the lower ends of said shafts 409. Fixed to the shafts 409 are meshing pinions 414. Extending from one of the shafts is a beveled gear 415 meshing with a beveled gear 416 of a horizontal transverse shaft 418. Shaft 418 carries a sprocket wheel 419 connected by sprocket chain 420 to a sprocket wheel 421 on the shaft 35. The arrangement is such that when shaft 35 is rotating, the rollers 408 will rotate in such a manner that the tail of a shrimp coming down from the top will be peeled downwardly. The rollers rotate toward each other and downwardly at the center.

It will now be understood that when the deveined and split shrimp is moved to the right with the head end of the shrimp coming forwardly, said head end of the shrimp will strike the pin 400 and the shrimp will catapult over the pin so that the tail will come down between the rollers, as illustrated in the drawing. The rotating rollers will peel the tail of the shrimp off the body and the body will slide down on the rollers to an inclined guide 430 to pass to any suitable vessel. The rollers 408 are preferably made of rubber or the like material. The reason the pin 400 is rotated is to throw off any particles clinging to the pin.

While the shrimp processing machine embodying my invention has been shown and described in detail, it is obvious that the invention is not to be considered limited to the exact form disclosed, but that changes may be made therein within the scope of what is claimed without departing from the spirit of the invention.

What I claim as new and desire to secure by Letters Patent is:

1. A shrimp processing machine comprising a table, front and rear wheels mounted on the table for rotation on parallel horizontal axes, a belt interconnecting said wheels, the upper run of the belt being located substantially in the plane of the top of the table, a pair of belts mounted on vertical pulleys on the table with the inner runs of said belts located above said upper run of said first belt, means to drive said belts so that the upper run of the first belt moves forwardly and the inner runs of said pair of belts move forwardly, so that a beheaded shrimp fed between the inner runs of said pair of belts and on said upper run of said first belt will be moved forwardly above said table, an elongated deveining tool comprising a plate disposed in a vertical plane between the inner runs of said pair of belts, with the upper edge of the tool substantially in the plane of the upper run of the first belt, said tool having a rearwardly extending point located substantially above the axis of the front wheel, and said tool having a curved under edge adjacent a portion of the first belt contacting the front wheel, whereby the shell of the shrimp will move between the curved under edge of the tool and the first belt for removal of the shell, and whereby the shrimp will be deveined, and whereby the shelled and deveined shrimp will be moved forwardly riding on the upper edge of said tool, and a cutter mounted on said tool in the plane thereof and projecting above said tool and located forwardly of said point, for slitting the deveined and shelled shrimp after they pass forwardly beyond the front pointed end of the tool, and as the shrimp is fed forwardly by said inner runs of said pair of belts, to prepare the shrimp for butterfly-style cooking.

2. The combination of claim 1, in combination with means to mount said tool for pivotal movement about a horizontal axis, and means for swinging the pointed end of the tool upwardly for adjusting the position of said pointed end.

3. The combination of claim 1, in combination with means for moving the cutter upwardly and downwardly to adjust the height of the cutter above the upper edge of the tool.

4. The combination of claim 1, in combination with a pin located forwardly of the tool and in the path of the deveined, shelled and slitted shrimp being moved forwardly by the inner runs of said pair of belts, to cause the shrimp to catapult over the pin when the leading end of the shrimp strikes the pin, a pair of rollers beyond the pin, means to rotate the rollers inwardly toward each other, whereby the tail of the catapulted shrimp will pass between the rollers, and whereby the rollers will remove said tail.

5. The combination of claim 4, in combination with means to rotate said pin.

6. The combination of claim 1, wherein said cutter comprises a blade having a cutting edge upwardly and forwardly inclined.

7. The combination of claim 6, including a thumb screw mechanism for adjusting the position of the blade relative to said tool.

8. The combination of claim 1, wherein said cutter comprises a rotating disk knife rotatably journalled within an opening in the rear portion of said disk knife having an upward portion extending substantially centrally between the inner runs of said pair of belts.

9. The combination of claim 2, wherein said adjusting means comprises a cam mounted on a table and engaging the tool, and being rotatable for raising the tool.

10. The combination of claim 1, in combination with a pair of rollers located forwardly of the tool and positioned to receive the deveined, shelled and slitted shrimp being moved forwardly by the inner runs of said pair of belts, means to rotate the rollers inwardly toward each other, whereby the tail of the received shrimp will pass between the rollers, and whereby the rollers will remove said tail.

References Cited in the file of this patent

UNITED STATES PATENTS

| | | |
|---|---|---|
| 2,034,691 | Bottker et al. | Mar. 24, 1936 |
| 2,637,064 | Miller | May 5, 1953 |
| 2,684,500 | Jones et al. | July 27, 1954 |
| 2,712,671 | Patterson et al. | July 12, 1955 |
| 2,716,776 | Streich et al. | Sept. 6, 1955 |
| 2,760,225 | Miller | Aug. 28, 1956 |